Dec. 1, 1964     J. HENRY-BAUDOT     3,159,761
ELECTRIC ROTARY MACHINES OF THE AXIAL AIR GAP TYPE
WITH COMPENSATED REACTION OF ARMATURE
Filed Jan. 21, 1960

Inventor:
Jacques Henry-Baudot
By Kenyon, Palmer and Stewart

United States Patent Office 3,159,761
Patented Dec. 1, 1964

3,159,761
ELECTRIC ROTARY MACHINES OF THE AXIAL AIR GAP TYPE WITH COMPENSATED REACTION OF ARMATURE
Jacques Henry-Baudot, Antony, France, assignor to Printed Motors Inc., New York, N.Y.
Filed Jan. 21, 1960, Ser. No. 3,770
Claims priority, application France, Feb. 18, 1959, 787,239, Patent 1,225,827
5 Claims. (Cl. 310—186)

The present invention concerns improvements in or relating to electric rotary machines the armature of which includes an electrical winding made of flat conductors intimately secured to the face or faces of an insulating support; as being formed thereon and for instance in accordance with one of the well-known so-called "printed" circuitry techniques.

It more particularly concerns machines made of discoidal members cooperating through an axial magnetic airgap and, with the winding conductors located within members enclosing the rotor. This has a tendency to enhance the parasitic effect of armature reaction which effect is well known per se for any kind of machines and may be summarized by stating that the ampere-turns developed from the passage of current through the rotor winding conductors produce in the magnetic inductor flux a curvature of this flux around the axis of rotation and in the direction of said rotation.

Figure 1:
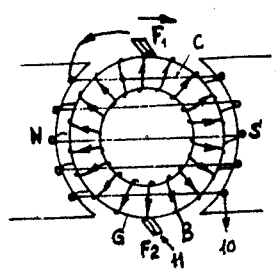

Referring to FIG. 1 of the accompanying drawings, this and the conventional compensating means may be better summarized. In FIG. 1 is shown a two-pole machine comprising an inductor having N and S poles between which rotates a Gramme ring G on the winding of which are applied brushes $F_1$ and $F_2$ on a diameter perpendicular to the normal direction of the magnetic flux of the inductor field. It is usual to compensate for the distortion of the magnetic field introduced by the rotation of the Gramme armature by means of a compensating winding C wound transversely with respect to the pole line of the inductor and having its turns parallel to said line. Such a winding is supported by passing through holes or slots in the magnetic pole pieces. Consequently, this compensating winding surrounds the armature winding and, by one end, it is connected to one of the brushes, $F_1$ for instance, so that the current from the armature also passes through it before reaching the external circuit across terminals 10 (to brush $F_2$) and 11 (from the output of C). The said compensating winding C thus produces a transverse flux orientated in the direction opposite to that produced by the armature winding. As it is the same electrical current which passes through both the armature and compensating windings, the number of turns of this latter one may in most cases be so provided that the ampere-turns it produces equal those produced by the armature windings. In the Gramme ring and the pole pieces, the armature reaction is substantially compensated, the equirepartition of the flux lines is recovered and the displacement of the neutral line due to armature reaction is practically cancelled.

It is the object of the invention to provide for the compensation of armature reaction in machines the rotor of which includes such a kind of winding as herein above specified.

According to the invention, this is done by inserting in the airgap of the machine, an electrical winding of identical pattern and structure as that of the rotor, mounted parallel and at close proximity to this latter winding but supported by a fixed member of the stator of the machine: either over the inductor pole structure itself on one side of the rotor, or over the magnetic yoke which, on the opposite side of the rotor, closes the magnetic flux lines from the inductor; said supplemental winding being provided with terminals interconnected with the brushes of the rotor winding so as to ensure the same current through both windings but in relatively reversed directions. From this simple arrangement, an absolute degree of compensation is easily obtained without any difficulties concerning the establishment of the compensating winding with respect of the pole structure of the machine.

Figure 2:
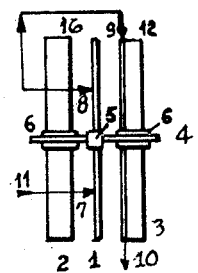
Figure 3:
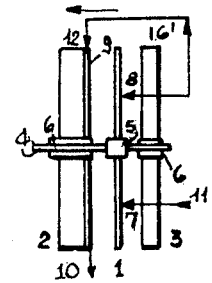
Figure 4:
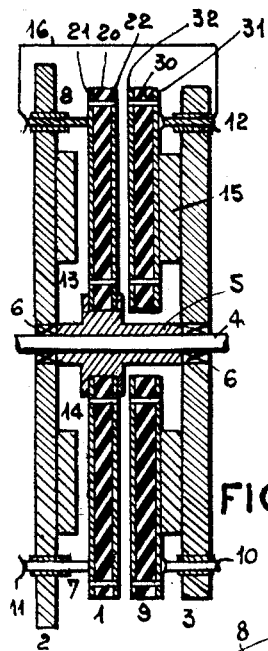
Figure 5:
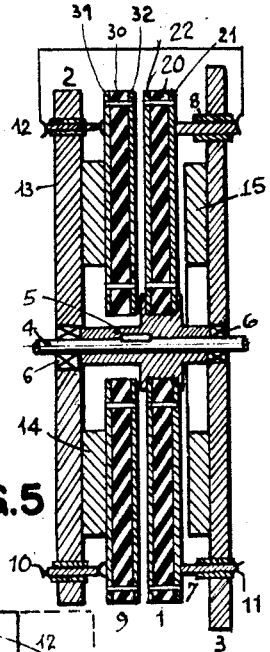
Figure 6:
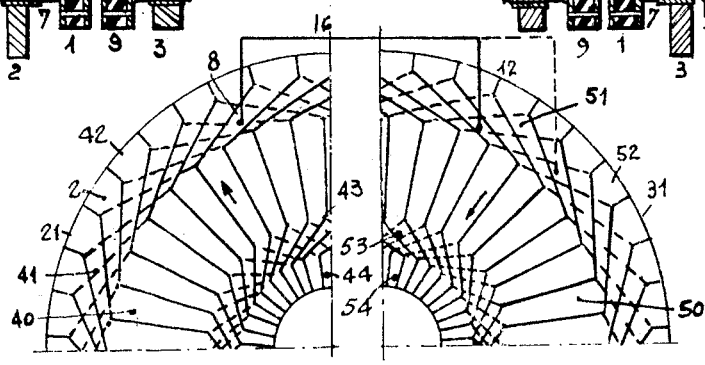

The invention will be ascertained with reference to the drawings which further show:

FIGS. 2 and 3, somewhat diagrammatic embodiments of machines according to the invention; and, FIGS. 4 and 5, corresponding and more detailed embodiments;

FIG. 6, the interconnection of the rotor and compensation winding in the case of a series-wave pattern.

A machine of the concerned kind comprises, FIGS. 2 and 3, a disk-shaped rotor 1 on a hub 5 secured to the shaft 4 passing through bearings 6 of two disk-shaped members enclosing the rotor. Member 2 is an inductor, member 3 is a yoke. The rotor solely includes a winding of the above-specified kind.

The inductor member includes a ring of pole pieces of regularly alternate magnetic polarity either permanent magnets or electro-magnets as the case may be. The yoke comprises a ring and, if the magnetic material thereof is also conducting, it is of a laminated structure for avoiding eddy currents therein.

The rotor or armature winding may be either of a series-wave pattern or, if required, of a lap pattern. References to such patterns in the special kind of armatures herein concerned may advantageously be found in my co-pending application Serial No. 1,128, filed January 7, 1960, which is a continuation in part of S.N. 691,434, filed October 21, 1957, now Patent No. 3,090,880.

When the pattern is of the series-wave type, one pair of brushes such as 7 and 8 suffice and they are diametrically arranged whatever the number of poles are in the machine. When the pattern is of the lap kind, as many pairs of brushes spaced apart by one pole pitch are provided; the brushes of identical polarity are interconnected and so are the brushes of the opposite polarity so that, finally, one has only to consider one pair of brushes for explaining the embodiments according to the invention, even if there are several pairs of brushes in the actual machine. The connections to the brushes are denoted 11 and 16.

For compensating for armature reaction in such machines, and according to the invention, a second winding identical to the first is inserted in the airgap and applied either to the inductor member, FIG. 2 or to the yoke member, FIG. 3. This supplemental winding 9 is provided with two terminals 12 and 10 displaced by 180°, whether it is of the series-wave or the lap type of pattern. Terminal 12 for instance is connected to output 16 of the armature (from the brush or brushes therefrom). The current circuit passes from terminal 10 to terminal 11, then, with winding 9 supplied by the armature current but in the reverse direction with respect to said armature winding.

Such arrangement ensures a complete cancellation of the armature reaction in the machine in a simple and efficient fashion.

The diagrammatic showing of FIGS. 2 and 3 will be more fully explained by reference to the structural showing of FIGS. 4, 5, and 6. Rotor 1 is made a carrier insulating ring 20 on the opposed faces of which are intimately secured two sets of half-turn conductors 21 and 22. For a series-wave winding for instance, said half-turns are of a pattern similar to the one shown at 21 in FIG. 6. Each half-turn is made of an intermediate and substantially radial portion 40 extended at both ends by curved or inclined portions 41 (outer portion) and 43 (inner portion). The portions 41 and 43 respectively end in such terminals which are 42 and 44, sectorial in shape. The face-to-face connections between the half-conductors of the two sets are provided from registering pairs of such terminals on the opposite faces of the carrier, and for instance by means of connections extending through the carrier. From one face to the other one, the direction of orientation of the end portions are reversed. See in FIG. 6 the dash lines indicating the delineations of the inclined conductor portions on the rear face. Active conductors 40 register from face to face. The degree of slant of the inclined portions define the pitch of the winding. FIG. 6 shows a winding having a total number of 41 conductors for a four pole machine. For a lap winding in a four pole machine, the winding will have 40 conductors and the inclinations will be of the same orientation for the outer and inner end portions of the half-turns.

The armature reaction compensating winding 9 is made identical to the winding on the rotor 1. In FIG. 6 part of this winding is shown at 31, so that the identity of the winding patterns is apparent. Each half-turn of either of sets 31 and 32 of the winding 9, on the carrier sheet 30, comprises a radial portion 50 extended by inclined or curved portions 51 and 52 ending in terminals 53 and 54 respectively. Each half-turn of 9 has the same dimensions as each half-turn of 1.

The inductor member of the stator comprises a ring of permanent magnets indicated at 13 and 14, secured to an annular base plate. The yoke part of the stator is made of an annular magnetic ring 15, which may be made of a flat iron ribbon coiled on end and secured to another base plate. The rotor is inserted between these stator members and in FIG. 5, the compensation winding 9 is inserted between the inductor member and the rotor. In FIG. 4, the winding 9 is inserted between the yoke member and the rotor. The brushes for the rotor are affixed to that stator member to which does not carry the compensation winding. The winding 9 is provided with two terminals the plugs of which 12 and 11 are supported by the base plate supporting the stator member to which carrier the compensating winding. In either case, the brush 8 is connected to the terminal 12 by an external connection 16 and consequently, the electrical diagram including the rotor and compensation winding is readily obtained in accordance with FIGS. 2 and 3, for the machines of FIGS. 4 and 5.

The brushes, shown as an example, as bearing on the portions 41 of the conductors of the face 21 are actually displaced with respect to the polar axis of the inductor structure of the machine. If these brushes bear on the portions 40, this displacement would be equal to one-half of the pole pitch. If the brushes were on the terminals of the half-turns, no displacement would be present. For compensating purposes, the terminals 12 and 10 of winding 9 must also be relatively displaced as are the brushes, except of course for the latter above mentioned case. In the shown example, the displacement of the terminals with respect to the brushes may be stated as follows, see FIG. 6: The current brought to the brush 8 by a conductor of the rotor winding the slanted portion of which is under this brush must be carried to a conductor of winding 9 wherein it passes in a reverse direction, the conductor of winding 9 "registering" with the conductor under the brush 8; assuming the orientations of the inclined portions of both windings under the brushes and the terminals are the same, this is shown in full line in FIG. 6. When said orientations are opposite, which may be also the case, if desired, by structural arrangement, terminals 12 would be set at the dotted position shown in FIG. 6.

I claim:
1. A dynamoelectric machine comprising: a pair of disc-shaped stator members positioned parallel to each other to define an axial air gap therebetween; a disc-shaped rotor member comprising an insulating body having windings including thin, flat conductors carried on opposite faces thereof, said rotor being positioned in said air gap; means carried by said stator members for producing a magnetic flux in said air gap; brush means carried by one of said stator members and contacting the conductors on said rotor; and an armature reaction compensating winding identical to said rotor windings carried by one of said stator members and connected to said brushes.

2. A machine as defined by claim 1 in which said compensating winding is connected in series with said rotor.

3. A machine as defined by claim 1 in which said compensating winding is formed on an insulating disc identical to the rotor disc.

4. A machine as defined by claim 1 in which said brushes are displaced from each other by one-half of the pole pitch.

5. A dynamoelectric machine comprising: a pair of disc-shaped stator members positioned parallel to each other to define an axial air gap therebetween; a disc-shaped rotor member comprising an insulating body having windings which are thin, flat conductors carried on opposite faces thereof, said rotor being positioned in said air gap; means carried by said stator members for producing a magnetic flux in said air gap; brush means carried by one of said stator members and contacting the conductors on said rotor; and an armature reaction compensating winding also being thin, flat conductors carried by the other of said stator members and electrically connected to said brushes.

References Cited in the file of this patent
UNITED STATES PATENTS

| | | |
|---|---|---|
| 1,223,449 | Turbayne | Apr. 24, 1917 |
| 2,777,080 | Kitzmiller | Jan. 8, 1957 |
| 2,847,589 | Haydon | Aug. 12, 1958 |